US011676033B1

United States Patent
Menon et al.

(10) Patent No.: US 11,676,033 B1
(45) Date of Patent: Jun. 13, 2023

(54) TRAINING MACHINE LEARNING MODELS TO BE ROBUST AGAINST LABEL NOISE

(71) Applicant: Google LLC, Mountain View, CA (US)

(72) Inventors: Aditya Krishna Menon, New York, NY (US); Ankit Singh Rawat, New York, NY (US); Sashank Jakkam Reddi, Jersey City, NJ (US); Sanjiv Kumar, Jericho, NY (US)

(73) Assignee: Google LLC, Mountain View, CA (US)

( * ) Notice: Subject to any disclaimer, the term of this patent is extended or adjusted under 35 U.S.C. 154(b) by 458 days.

(21) Appl. No.: 16/812,160

(22) Filed: Mar. 6, 2020

(51) Int. Cl.
*G06N 3/04* (2023.01)
*G06N 3/084* (2023.01)

(52) U.S. Cl.
CPC .............. *G06N 3/084* (2013.01); *G06N 3/04* (2013.01)

(58) Field of Classification Search
CPC ................................ G06N 3/084; G06N 3/04
USPC ......................................................... 706/20
See application file for complete search history.

(56) References Cited

U.S. PATENT DOCUMENTS

| 2021/0256387 A1* | 8/2021 | Chopra | G06N 3/04 |
| 2022/0076125 A1* | 3/2022 | Mizukoshi | G06K 9/6262 |

OTHER PUBLICATIONS

Pijika Watcharapichat, Victoria Lopez Morales, Raul Castro Fernandez, Peter Pietzuch, "Ako: Decentralised Deep Learning with Partial Gradient Exchange." Oct. 2016, ACM, p. 84-95. (Year: 2016).*
Abadi et al, "Deep learning with differential privacy" Proceedings of the 2016 ACM SIGSAC Conference on Computer and Communications Security, 2016, 11 pages.
Levy et al, "The power of normalization: Faster evasion of saddle points", arXiv, 2016, 33 pages.
Pichapati et al, "AdaCliP: Adaptive Clipping for Private SGD" arXiv, 2019, 19 pages.
Shen et al, "Learning with bad training data via iterative trimmed loss minimization" Proceedings of the 36th International Conference on Machine Learning, 2019, 10 pages.
Van Rooyen et al, "A theory of learning with corrupted labels" Journal of Machine Learning Research, 2018, 50 pages.
Zhang et al, "Analysis of gradient clipping and adaptive scaling with a relaxed smoothness condition", arXiv, May 2019, 18 pages.
Amid et al., "Robust bi-tempered logistic loss based on Bregman divergences," Advances in Neural Information Processing Systems, Dec. 2019, 10 pages.
Amid et al., "Two-temperature logistic regression based on the Tsallis divergence," Presented at the 22nd International Conference on Artificial Intelligence and Statistics, Naha, Okinawa, Japan, Apr. 16-18, 2019, 9 pages.
Bartlett et al., "Convexity, classification, and risk bounds," Journal of the American Statistical Association, Mar. 2006, 20 pages.

(Continued)

*Primary Examiner* — Tyler J Lee
*Assistant Examiner* — Tiffany P Ohman
(74) *Attorney, Agent, or Firm* — Fish & Richardson P.C.

(57) ABSTRACT

A method for training a machine learning model, e.g., a neural network, using a regularization scheme is disclosed. The method includes generating regularized partial gradients of losses computed using an objective function for training the machine learning model.

20 Claims, 3 Drawing Sheets

(56) References Cited

OTHER PUBLICATIONS

Bartlett et al., "Rademacher and gaussian complexities: Risk bounds and structural results," Journal of Machine Learning Research, Nov. 2002, 20 pages.
Bengio et al., "Learning long-term dependencies with gradient descent is difficult," Trans. Neur. Netw., Mar. 1994, 5(2):157-166.
Bhatia et al., "Robust regression via hard thresholding," Proceedings of the 28th International Conference on Neural Information Processing Systems, Dec. 2015, 9 pages.
Brownlees et al., "Empirical risk minimization for heavy-tailed losses," Ann Statist., Dec. 2015, 43(6):2507-2536.
Buja et al., "Loss functions for binary class probability estimation and classification: Structure and applications," Technical report, UPenn, Nov. 3, 2005, 49 pages.
Catoni, "Challenging the empirical mean and empirical variance: A deviation study," Ann. Inst., Jan. 2012, 38 pages.
Charoenphakdee et al., "On symmetric losses for learning from corrupted labels," Proceedings of the 36th International Conference on Machine Learning, Jun. 2019, 10 pages.
Cid-Sueiro et al., "Consistency of losses for learning from weak labels," Machine Learning and Knowledge Discovery in Databases, 2014, 14 pages.
Copas, "Binary regression models for contaminated data," Journal of the Royal Statistical Society Series B (Methodological), 1988, 29 pages.
Ding et al. "t-logistic regression," Advances in Neural Information Processing Systems, Dec. 2010, 9 pages.
Duchi et al., "Variance-based regularization with convex objectives," Journal of Machine Learning Research, May 2019, 55 pages.
Ekholm et al., "A model for a binary response with misclassifications," Proceedings of the International Conference on Generalised Linear Models, 1982, pp. 128-143.
Feng et al., "Robust logistic regression and classification," Advances in Neural Information Processing Systems, Dec. 2014, 9 pages.
Gehring et al., "Convolutional sequence to sequence learning," Proceedings of the 34th International Conference on Machine Learning, 2017, 10 pages.
Ghosh et al., "Making risk minimization tolerant to label noise," Neurocomputing, Jul. 21, 2015, 160:93-107.
Ghosh et al., "Robust loss functions under label noise for deep neural networks," Proceedings of the Thirty-First AAAI Conference on Artificial Intelligence, Feb. 13, 2017, 7 pages.
Han et al., "Co-teaching: Robust training of deep neural networks with extremely noisy labels," Proceedings of the 32nd International Conference on Neural Information Processing Systems, 2018, 11 pages.
Hazan et al., "Beyond convexity: Stochastic quasi-convex optimization," Proceedings of the 28th International Conference on Neural Information Processing Systems, Dec. 2015, 9 pages.
He et al., "Deep residual learning for image recognition," IEEE Conference on Computer Vision and Pattern Recognition (CVPR), Jun. 2016, 9 pages.
Holland et al., "Better generalization with less data using robust gradient descent," Proceedings of the 36th International Conference on Machine Learning, Jun. 2019, 10 pages.
Hsu et al., "Loss minimization and parameter estimation with heavy tails," Journal of Machine Learning Research, Apr. 2016, 40 pages.
Huber, "Robust estimation of a location parameter," Ann. Math. Statist., Mar. 1964, 27 pages.
Huber., "Finite sample breakdown of m- and p-estimators," Ann. Statist., Mar. 1984, 8 pages.
Hung et al., "Robust mislabel logistic regression without modeling mislabel probabilities," Biometrics, May 10, 2017, 10 pages.
Katz-Samuels et al., "Decontamination of mutual contamination models," Journal of Machine Learning Research, Jan. 2019, 57 pages.
Krizhevsky et al., "Learning multiple layers of features from tiny images," Master's thesis, Department of Computer Science, University of Toronto, Apr. 8, 2009, 60 pages.

Lecué et al., "Robust classification via MOM minimization," Machine Learning, Apr. 27, 2020, 31 pages.
Lerasle et al., "Robust empirical mean Estimators," arXiv, Dec. 16, 2011, 47 pages.
Liu et al., "Classification with noisy labels by importance reweighting," IEEE Transactions on Pattern Analysis and Machine Intelligence, Mar. 2016, 14 pages.
Loh, "Statistical consistency and asymptotic normality for high-dimensional robust m-estimators," Ann. Statist., Apr. 2017, 31 pages.
Long et al., "Random classification noise defeats all convex potential boosters," Proceedings of the 25th international conference on Machine learning, Jul. 2008, 8 pages.
Lugosi et al., "Risk minimization by median-of-means tournaments," arXiv, Aug. 2016, 40 pages.
Malach et al., Decoupling "when to update" from "how to update," Proceedings of the 31st International Conference on Neural Information Processing Systems, 2017, 11 pages.
Masnadi-Shirazi et al., "On the design of loss functions for classification: theory, robustness to outliers, and SavageBoost," Advances in Neural Information Processing Systems, Dec. 2009, 8 pages.
Menon et al., "A loss framework for calibrated anomaly detection," Advances in Neural Information Processing Systems, 2018, 11 pages.
Menon et al., "Learning from corrupted binary labels via class-probability estimation," Proceedings of the 32nd International Conference on Machine Learning, 2015, 10 pages.
Merity et al., "Regularizing and optimizing LSTM language models," International Conference on Learning Representations, May 2018, 13 pages.
Mikolov, "Statistical Language Models Based on Neural Networks," PhD thesis, Brno University of Technology, Apr. 2, 2012, 133 pages.
Minsker, "Geometric median and robust estimation in Banach spaces," Bernoulli, Nov. 2015, 28 pages.
Mnih et al., "Human-level control through deep reinforcement learning," Nature, Feb. 26, 2015, 518(7540):529-533.
Namkoong et al., "Stochastic gradient methods for distributionally robust optimization with f-divergences," Advances in Neural Information Processing Systems, Dec. 2016, 9 pages.
Namkoong et al., "Variance regularization with convex objectives," Advances in Neural Information Processing Systems (NeurIPS), Dec. 2017, 10 pages.
Natarajan et al., "Cost-sensitive learning with noisy labels," Journal of Machine Learning Research, Apr. 2018, 33 pages.
Natarajan et al., "Learning with noisy labels," Advances in Neural Information Processing Systems, 2013, 9 pages.
Nock et al., "On the efficient minimization of classification calibrated surrogates," Advances in Neural Information Processing Systems, Dec. 2009, 8 pages.
Pascanu et al., "On the difficulty of training recurrent neural networks," Proceedings of the 30th International Conference on International Conference on Machine Learning, 2013, 9 pages.
Pascanu et al., "Understanding the exploding gradient problem," arXiv, Nov. 21, 2012, 11 pages.
Patrini et al., "Loss factorization, weakly supervised learning and label noise robustness," Proceedings of the 33rd International Conference on Machine Learning, 2016, 10 pages.
Patrini et al., "Making deep neural networks robust to label noise: a loss correction approach," Computer Vision and Pattern Recognition, Jul. 2017, pp. 2233-2241.
Peters et al., "Deep contextualized word representations," Proceedings of the 2018 Conference of the North American Chapter of the Association for Computational Linguistics: Human Language Technologies, Jun. 2018, pp. 2227-2237.
Prasad et al., "Robust Estimation via Robust Gradient Estimation," arXiv, Apr. 20, 2018, 48 pages.
Pregibon, "Resistant fits for some commonly used logistic models with medical applications," Biometrics, Jun. 1982, 15 pages.
Reid et al., "Composite binary losses," Journal of Machine Learning Research, Sep. 2010, 36 pages.
Rosset et al., "Piecewise linear regularized solution paths," Ann. Statist., Jul. 2007, 20 pages.

(56) References Cited

OTHER PUBLICATIONS

Savage, "Elicitation of personal probabilities and expectations," Journal of the American Statistical Association, Dec. 1971, 20 pages.

Schervish, "A general method for comparing probability assessors," Ann. Statist., Dec. 1989, 24 pages.

Scott et al., "Classification with asymmetric label noise: consistency and maximal denoising," Proceedings of the 26th Annual Conference on Learning Theory, 2013, 23 pages.

Shafieezadeh-Abadeh et al., "Distributionally robust logistic regression," Proceedings of the 28th International Conference on Neural Information Processing Systems, Dec. 2015, 9 pages.

Shevlyakov et al., "Redescending m-estimators," Journal of Statistical Planning and Inference, Oct. 1, 2008, 12 pages.

Sinha et al., "Certifying some distributional robustness with principled adversarial training," Presented at 6th International Conference on Learning Representations, Vancouver, BC, Canada, Apr. 30-May 3, 2018, 34 pages.

Song et al., "Selfie: Refurbishing unclean samples for robust deep learning," Proceedings of the 36th International Conference on Machine Learning, Jun. 2019, 9 pages.

Takenouchi et al., "Robustifying AdaBoost by adding the naive error rate," Neural Computation, Apr. 2004, 16(4):767-787.

Thulasidasan et al., "Combating label noise in deep learning using abstention," Presented at 36th International Conference on Machine Learning, Long Beach, California, USA, Jun. 9-15, 2019, 10 pages.

Van Rooyen et al., "Learning with symmetric label noise: the importance of being unhinged," Advances in Neural Information Processing Systems (NIPS), Dec. 2015, 9 pages.

Yang et al., "A general family of trimmed estimators for robust high-dimensional data analysis," Electron, J. Statist, Oct. 2018, 35 pages.

Yang et al., "Relaxed clipping: A global training method for robust regression and classification," Advances in Neural Information Processing Systems, Dec. 2010, 9 pages.

Zhang et al., "A robust risk minimization based named entity recognition system," Proceedings of the Seventh Conference on Natural Language Learning, 2003, 4 pages.

Zhang et al., "Generalized cross entropy loss for training deep neural networks with noisy labels," Proceedings of the 32nd International Conference on Neural Information Processing Systems, 2018, 11 pages.

Zhang et al., "Text chunking based on a generalization of winnow," J. Mach. Learn. Res., Mar. 2002, 2:615-637.

Zhang, "Statistical behavior and consistency of classification methods based on convex risk minimization," Annals of Statistics, Feb. 2004, 32(1):56-85.

\* cited by examiner

TRAINING MACHINE LEARNING MODELS TO BE ROBUST AGAINST LABEL NOISE

BACKGROUND

This specification relates to training machine learning models.

A machine learning model receives input and generates an output based on the received input and on values of the parameters of the model. For example, machine learning models may receive an image and generate a score for each of a set of classes, with the score for a given class representing a probability that the image contains an image of an object that belongs to the class.

The machine learning model may be composed of, e.g., a single level of linear or non-linear operations or may be a deep network, i.e., a machine learning model that is composed of multiple levels, one or more of which may be layers of non-linear operations. An example of a deep network is a neural network with one or more hidden layers.

SUMMARY

This specification describes a system implemented as computer programs on one or more computers in one or more locations that trains a machine learning model to generate one or more outputs based on the received one or more inputs.

In general, one innovative aspect of the subject matter described in this specification can be embodied in methods that include the actions of training a machine learning model having a plurality of model parameters and configured to receive a model input and to process the model input in accordance with the model parameters to generate a model output based on the model input, the method including: obtaining a training input and a corresponding ground truth output; processing the training input using the machine learning model and in accordance with current values of the model parameters to generate a training output based on the training input; computing a loss for the training output by evaluating an objective function that measures a difference between the training output and the ground truth output, wherein the objective function is composed of a base loss and a link function; and determining an update to current values of the model parameters, including: determining, with respect to the model parameters, respective gradients of the base loss and the link function; generating a regularized gradient of the base loss; generating a recomposition of the regularized gradient of the based loss and the gradient of the link function; and computing the update from the generated recomposition.

In some implementations, generating the regularized gradient of the base loss includes: determining whether a norm of the gradient of the base loss exceeds a particular threshold; and when the norm of the gradient of the base loss exceeds the particular threshold: clipping the gradient of the base loss to equal the particular threshold.

In some implementations, the machine learning model is a neural network; and computing the update from the generated recomposition includes backpropagating the generated recomposition through network parameters.

In some implementations, the base loss includes a log loss, a square loss, a Matsushita loss, a boosting loss, or a Q-loss.

In some implementations, the link function includes a sigmoid function, a probit function, a capped linear function, or a Matsushita function.

In some implementations, the model input includes one or more input variables, and the model output specifies a respective predicted classification for each input variable.

In some implementations, the method further includes: providing data specifying the trained machine learning model.

In some implementations, the method further includes: using the trained machine learning model to process new training inputs.

Other embodiments of this aspect include corresponding systems, apparatus, and computer programs, configured to perform the actions of the methods, encoded on computer storage devices.

The subject matter described in this specification can be implemented in particular embodiments so as to realize one or more of the following advantages.

A machine learning model is typically trained on one or more training datasets to learn to perform particular machine learning tasks. For example, a training dataset for classification tasks can include a plurality of training inputs each associated with a corresponding ground truth output which specifies a label identifying the classification of the training input. For various reasons, training machine learning models can consume a large amount of computational resources and wall clock time.

First, the training dataset may be noisy. A noisy training dataset includes one or more noisy training inputs that are associated with wrong labels that incorrectly identify the ground truth classifications of the training inputs. Such noisy training inputs inhibit successful training of machine learning models, and in turn, degrade the performance of the trained models. This is because during the training, wrong labels can lead to incorrect evaluation of objective functions, which further leads to erroneous updates to model parameter values.

Second, in many machine learning training scenarios, at each iteration of the training process, current values of parameters of the model are updated using a determined gradient, i.e., the gradient of an objective function that measures the quality of the training outputs. Typically, the size of the determined gradient directly affects the quality of the training of the network. In some cases where the machine learning model is a deep neural network, i.e., having a plurality of network layers, in order to complete a training iteration, the determined gradient has to be propagated back from a last network layer all the way to a first network layer in the deep neural network. Because of this, in circumstances where the size of the determined gradient is large, then it may become even larger during the backpropagation process, causing numerical overflow or irregular oscillations in the objective function that is used to calculate the gradient. This scenario is referred to as an exploding gradient. Exploding gradients also inhibit the machine learning model from further training.

While conventional gradient clipping techniques can largely alleviate the second issue, for example, by clipping the full gradient of the loss, these techniques fail to resolve the first one. In other words, in cases where the training dataset is noisy, training the machine learning model using these conventional techniques generally does not provide robustness against label noise and, in turn, inhibits successful learning of the model.

The described technique, however, augments the training process by generating regularized partial gradients of losses computed using an objective function. In particular, at some or all of the training iterations, for a loss computed using any objective function that is composed of a base loss and a link function, the system regularizes the partial gradient of the loss that is specific to the base loss of the objective function. That is, the system preserves the intactness of the partial gradient of the loss that is specific to the link function. The base loss can be, for example, a log loss, a square loss, a Matsushita loss, a boosting loss, or a Q-loss. The link function can be, for example, a softmax function, a sigmoid function, a probit function, a capped linear function, or a Matsushita function.

In this manner, the described system is capable of maintaining an effective training process of the machine learning model by mitigating any negative impact caused by label noise, exploding gradients, or both. In other words, the system can effectively train the network to generate high quality outputs for a particular task in a much more computationally efficient manner than other techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that trains a machine learning model to generate one or more outputs based on the received one or more inputs. In particular, the machine learning model can be configured to receive any kind of digital data input and to generate any kind of classification output based on the input. The classification can be, for example, a type, a class, a group, a category, or a measurement.

For example, the machine learning model can be configured to perform an image classification task, e.g., to receive an input that is one or more images or features that have been extracted from one or more images and to process the input to generate an output that may include scores for each of a set of object categories, with each score representing an estimated likelihood that the image contains an image of an object belonging to the category.

As another example, if the inputs to the machine learning model are Internet resources (e.g., web pages), documents, or portions of documents or features extracted from Internet resources, documents, or portions of documents, the outputs generated by the machine learning model for a given Internet resource, document, or portion of a document may be a score for each of a set of topics, with each score representing an estimated likelihood that the Internet resource, document, or document portion is about the topic.

Figure 1:
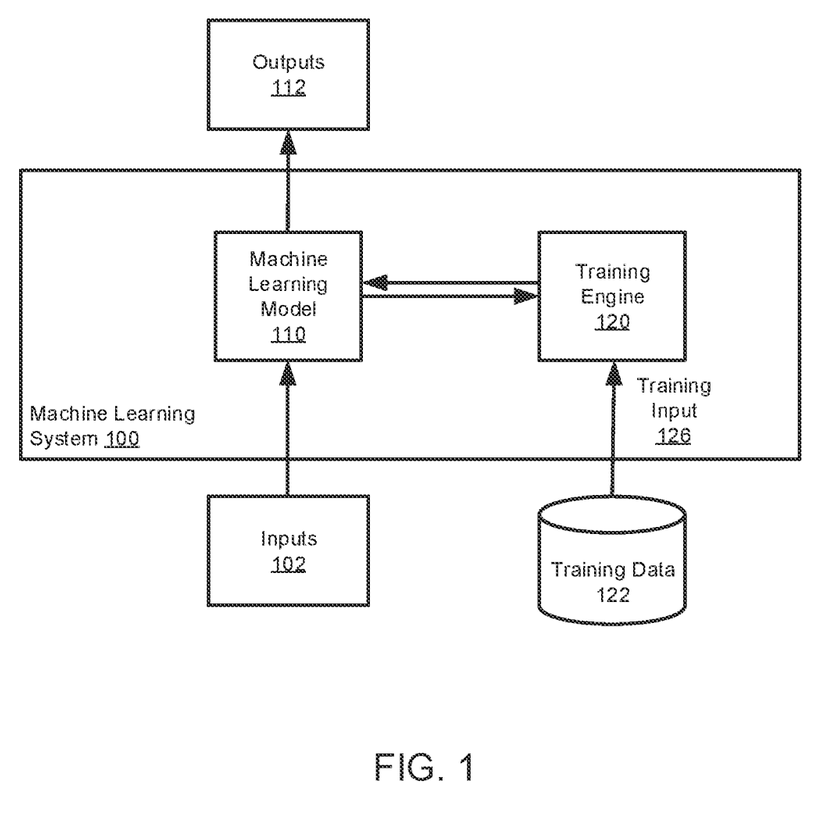
FIG. 1 shows an example machine learning system.

FIG. 1 shows an example machine learning system 100. The machine learning system 100 is an example of a system implemented as computer programs on one or more computers in one or more locations, in which the systems, components, and techniques described below are implemented.

The machine learning system 100 includes a machine learning model 110 and a training engine 120. Generally, the machine learning model 110 receives an input 102 and generates an output 112 based on the received input and on values of the parameters of the model. For example, the machine learning model 110 can be configured as a logistic regression model, a support vector machine (SVM) model, a gradient boosting model, or a neural network.

The training engine 120 trains the machine learning model 110 on training inputs 126 from training data 122 using an iterative training process. Each training input 126 is associated with a corresponding ground truth output. Typically, the ground truth output includes a label which identifies a classification of the training input. The training engine 120 trains the machine learning model using the iterative training process to determine trained values of the parameters of the machine learning model.

At each iteration of the training process, the training engine 120 receives a mini-batch of one or more training inputs 126 from the training data 122 and processes the mini-batch using the machine learning model 110 in accordance with the current values of the model parameters to generate a training output for each input in the mini-batch. The training engine 120 determines a gradient of an objective function that measures the quality of the training output, i.e., relative to the ground truth output associated with the training input 126, with respect to the parameters of the machine learning model 110.

At the end of each training iteration, the training engine 120 applies respective updates to the current values of the parameters of the machine learning model 110 using the gradients determined at the iteration.

In various cases, the training data 122 may include noisy training inputs. Referring to a training input as a noisy one indicates that the label included in the corresponding ground truth output is a noisy (i.e., wrong) label that incorrectly identifies the ground truth classification of the training input. For example, in binary classification training data, the noisy training inputs consist of training inputs that are associated with flipped labels.

Such noisy training inputs inhibit successful training of machine learning models, and in turn, degrade the performance of the trained models. This is because during the training, wrong labels can lead to incorrect evaluation of objective functions, which further leads to erroneous updates to model parameter values.

Additionally, in cases where the machine learning model 110 is configured as a deep neural network (i.e., a neural network with multiple network layers), respective updates to model parameter values are typically determined through backpropagation. That is, the training engine 120 backpropagates the determined gradient of the objective function from a last network layer all the way to a first network layer in the neural network. Because of this, in circumstances where the size of the determined gradient is large, then it may become even larger during the backpropagation process, causing numerical overflow or irregular oscillations in the objective function that is used to calculate the gradient. This scenario is referred to as an exploding gradient. Exploding gradients further inhibit the model 110 from successful training.

Therefore, to improve the training of the machine learning model 110, the training engine 120 augments the training by using a regularization technique. Regularizing the training of the machine learning model 110 will be described below with reference to FIGS. 2 and 3.

Once the machine learning model 110 has been trained with training data 122, the system 100 can provide data specifying the trained machine learning model, e.g., the trained values of the parameters of the machine learning model and data specifying the architecture of the machine learning model, to another system, e.g., a second machine learning system, for use in processing new inputs. Instead of or in addition to providing the data specifying the trained model, the system 100 can use the trained machine learning model to process new inputs 102 and generate respective outputs 112.

Figure 2:
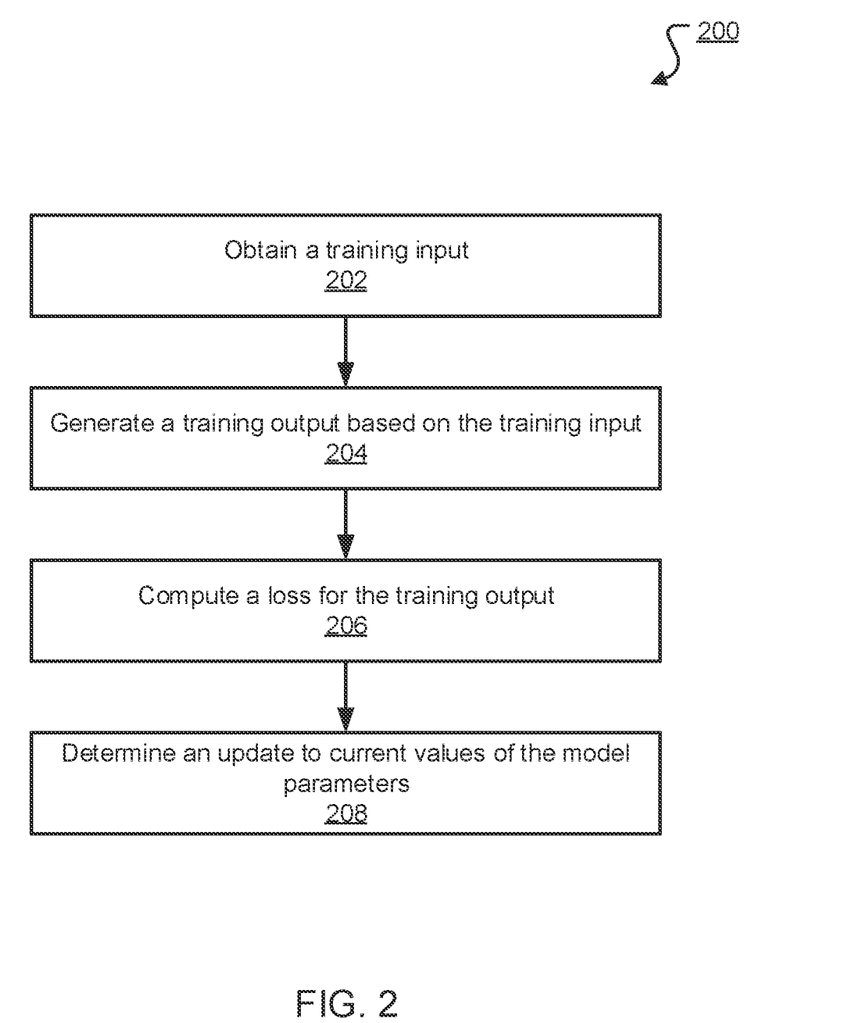
FIG. 2 is a flow diagram of an example process for training a machine learning model.

FIG. 2 is a flow diagram of an example process 200 for training a machine learning model. For convenience, the process 200 will be described as being performed by a system of one or more computers located in one or more locations. For example, a machine learning system, e.g., the machine learning system 100 of FIG. 1, appropriately programmed in accordance with this specification, can perform the process 200.

The system obtains a training input and a corresponding ground truth output (202). The corresponding ground truth output includes a label which identifies a classification of the training input.

The system generates a training output based on the training input (204). The system can do so by processing the training input using the machine learning model in accordance with current values of the model parameters. Mathematically, the training output can be expressed as $s(x;\theta)$, where x is the training input, and $\theta$ corresponds to all parameters of the machine learning model.

The system computes a loss for the training output (206). Typically, the loss characterizes a difference between the training output and the ground truth output. The system can compute the loss by evaluating an objective function that measures the quality of the training output, i.e., relative to the ground truth output, with respect to the parameters of the machine learning model.

In general, the objective function $\phi = \varphi \circ F$ is composed of a base loss $\varphi$ and a link function $F: \mathbb{R} \to [0,1]$. The base loss can be obtained by evaluating a loss function which evaluates a measure of the difference between the training output and the ground truth output. For example, the loss function $\varphi(\upsilon)$ can be a log loss function $\log(1+e^{-\upsilon})$, a square loss function $(1-\upsilon)^2$, a Matsushita loss function $$\frac{\upsilon}{2} + \sqrt{1 + \frac{\upsilon^2}{4}},$$

a boosting loss function $e^{-\upsilon}$, or a Q-loss function $\max(0, -\upsilon) - \frac{1}{2} \cdot \log(1+|\upsilon|)$. The link function transforms the outputs of the machine learning model that are in form of real-valued scores (e.g., the final layer logits of a neural network) into classification probability estimates that are in a continuous domain. For example, the link function can be a softmax function, a sigmoid function, a probit function, a capped linear function, or a Matsushita function.

In mathematical terms, the system typically evaluates the objective function $\phi$ with respect to the training output $s(x,\theta)$, and optionally, the ground truth output y, where x is the training input, and $\theta$ are model parameters. Accordingly, the system computes the loss as $l(x,y;\theta) \doteq \phi(s(x;\theta))$ (Equation 1).

In a more concrete example, the system evaluates an objective function that is defined as a logistic function with respect to training output $z=s(x;\theta)$. The system then computes the loss as $\phi(z) = \varphi(F(z))$, where z is the training output, $\varphi(\upsilon) = -\log \upsilon$ is the base loss, and $$F(z) = \sigma(z) = \frac{1}{1 + \exp(-z)}$$

is the link function.

The system determines an update to current values of the model parameters (208) using a determined gradient of the objective function. Briefly, determining the update involves augmenting the determined gradient by regularizing the partial gradient that corresponds specifically to the base loss. This augmentation technique is described in more detail below with reference to FIG. 3.

The system then proceeds to update the current values of the model parameters based on the determined update in accordance with an appropriate machine learning training algorithm (e.g., stochastic gradient descent algorithm, Adam algorithm, or rmsProp algorithm). Alternatively, the system only proceeds to update the current parameter values once the process 200 has been performed for an entire mini-batch of training inputs. A mini-batch generally includes a fixed number of training inputs, e.g., 16, 64, or 256. In other words, the system combines, e.g., by computing a weighted or unweighted average between, respective updates that are determined during the fixed number of iterations of process 200 and proceeds to update the current parameter values based on the combined update.

Figure 3:
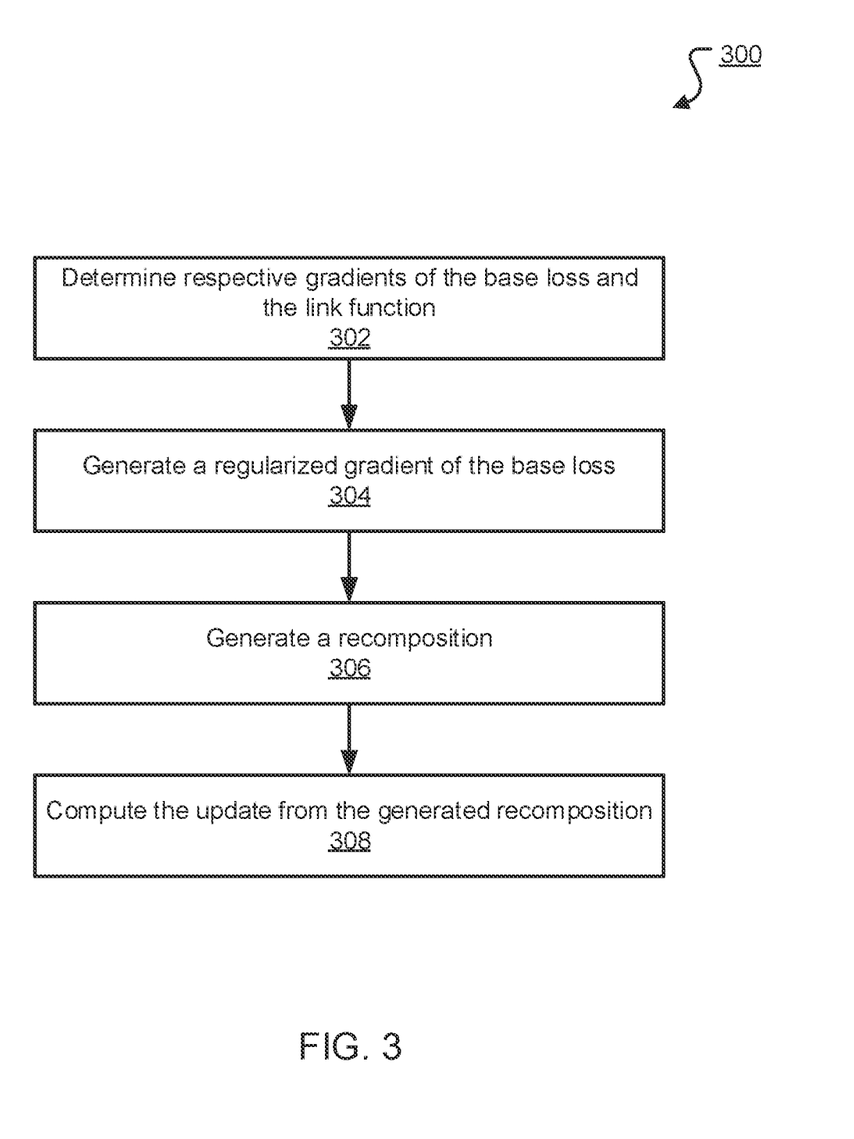
FIG. 3 is a flow diagram of an example process for determining an update to model parameters by using a regularization technique.

FIG. 3 is a flow diagram of an example process 300 for determining an update to model parameters by using a regularization technique. For convenience, the process 300 will be described as being performed by a system of one or more computers located in one or more locations. For example, a machine learning system, e.g., the machine learning system 100 of FIG. 1, appropriately programmed in accordance with this specification, can perform the process 300.

The system determines respective gradients of the base loss and the link function (302) with respect the parameters of the machine learning model. Mathematically, for each loss $l(x,y;\theta)$ computed using Equation 1 as defined above, the gradient of the loss can be defined as $\nabla_\theta l(x,y;\theta) = \nabla_\theta s(x;\theta) \cdot \phi'(s(x;\theta))$. (Equation 2). Because each loss of a training output is evaluated using an objective function $\phi = \varphi \circ F$ that composes of a base loss $\varphi$ and a link function F, the corresponding gradient of the loss, in turn, depends on respective gradients of the base loss and the link function. The loss $l(x,y;\theta)$ can then be rewritten as $\varphi p((x;\theta))$, where $p(x;\theta) \doteq F(s(x;\theta))$ corresponds to the classification probability estimate of the machine learning model. As such, the system computes the gradient of the loss as $\nabla_\theta p(x;\theta) \cdot \varphi'(p(x;\theta))$ (Equation 3). In particular, as shown in Equation 3, $\nabla_\theta p(x;\theta)$ is the partial gradient that is specific to the link function, and $\varphi'(p(x;\theta))$ is the partial gradient that is specific to the base loss.

The system generates a regularized gradient of the base loss (304). In some implementations, to generate the regularized gradient, the system can determine whether a regularization criterion is met. For example, the system can determine whether a norm of the gradient of the base loss exceeds a particular threshold. In response to a positive determination, e.g., when the norm of the gradient of the base loss exceeds the particular threshold, the system clips the gradient of the base loss to equal the particular threshold. In response to determining that a training termination criterion is not met, the system continues to step 306 by using the original gradient as the regularized gradient.

Conventional regularization techniques include, for example, gradient clipping (Equation 4) and loss-based gradient clipping (Equation 5).

$$\text{clip}_r(\nabla_\theta l(x,y;\theta)) \doteq \text{clip}_r(x;\theta) \cdot \phi'(s(x;\theta)))$$ Equation 4

$$\text{lclip}_r(\nabla_\theta l(x,y;\theta)) \doteq \nabla_\theta s(x;\theta) \cdot \text{clip}_r(\phi'(s(x;\theta)))$$ Equation 5

Unlike any of these conventional techniques, the system only regularizes the partial gradient that corresponds to the gradient of the base loss, while retaining the gradient of the link function (Equation 6).

$$\text{pclip}_r(\nabla_\theta l(x,y;\theta)) \doteq \nabla_\theta p(x;\theta) \cdot \text{clip}_r(\phi'(p(x;\theta)))$$ Equation 6

Briefly, in Equations 4-6, $\text{clip}_r$ is an operator which clips the input to the operator to have norm at most a threshold value $\tau$. For example, Equation 6 specifies clipping the partial gradient that corresponds to the gradient of the base loss to equal to r when its norm is greater than $\tau$.

The system generates a recomposition (306) of the regularized gradient of the based loss and the gradient of the link function. In other words, the system computes a value of Equation 6 as defined above by using the gradient of the link function and the regularized gradient of the base loss.

The system computes the update to current values of the model parameters from the generated recomposition (308). In implementations where the machine learning model is configured as a neural network, computing the respective updates to model parameter values involves backpropagating the generated recomposition through all layers of the model. Each layer in turn includes a plurality of model parameters.

Computing updates in this manner can prevent exploding gradients, and more importantly, provide robustness against label noise by mitigating the impact of any noisy labels on the training of the machine learning models. As shown in Equation 6, this is because the system has bounded the loss derivative by effectively modifying the objective function that is used to determine the loss to behave like the link function beyond a particular threshold.

Conventional regularization techniques including the examples defined in Equations 4-5, however, generally do not provide such robustness. In fact, in some cases, with the presence of noisy labels in training data, training machine learning models using conventional regularization techniques merely endows the trained models with a level of performance on classification tasks that is no better than random guessing.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a machine learning model having a plurality of model parameters and configured to receive a model input and to process the model input in accordance with the model parameters to generate a model output based on the model input, the method comprising:
   obtaining a training input and a corresponding ground truth output;
   processing the training input using the machine learning model and in accordance with current values of the model parameters to generate a training output based on the training input;
   computing a loss for the training output by evaluating an objective function that measures a difference between the training output and the ground truth output, wherein the objective function is composed of a base loss and a link function; and
   determining an update to current values of the model parameters, comprising:
      determining, with respect to the model parameters, a first partial gradient of the loss with respect to the base loss and a second partial gradient of the loss with respect to the link function;
      regularizing the first partial gradient of the loss to generate a regularized first partial gradient of the loss;
      generating a recomposition of the regularized partial first gradient of the loss and the second partial gradient of the loss; and
      computing the update from the generated recomposition.

2. The method of claim 1, wherein regularizing the first partial gradient of the loss comprises:
   determining whether a norm of the first partial gradient of the loss exceeds a particular threshold; and
   when the norm of the first partial gradient of the loss exceeds the particular threshold:
      clipping the first partial gradient of the loss to equal the particular threshold.

3. The method of claim 1, wherein:
   the machine learning model is a neural network; and
   computing the update from the generated recomposition comprises backpropagating the generated recomposition through network parameters.

4. The method of claim 1, wherein the base loss comprises a log loss, a square loss, a Matsushita loss, a boosting loss, or a Q-loss.

5. The method of claim 1, wherein the link function comprises a sigmoid function, a probit function, a capped linear function, or a Matsushita function.

6. The method of claim 1, wherein the model input includes one or more input variables, and the model output specifies a respective predicted classification for each input variable.

7. The method of claim 1, further comprising:
   providing data specifying the trained machine learning model.

8. The method of claim 1, further comprising:
   using the trained machine learning model to process new training inputs.

9. A system comprising one or more computers and one or more storage devices storing instructions that when executed by the one or more computers cause the one or more computers to perform operations for training a machine learning model having a plurality of model parameters and configured to receive a model input and to process the model input in accordance with the model parameters to generate a model output based on the model input, the operations comprising:
   obtaining a training input and a corresponding ground truth output;
   processing the training input using the machine learning model and in accordance with current values of the model parameters to generate a training output based on the training input;
   computing a loss for the training output by evaluating an objective function that measures a difference between the training output and the ground truth output, wherein the objective function is composed of a base loss and a link function; and
   determining an update to current values of the model parameters, comprising:
      determining, with respect to the model parameters, a first partial gradient of the loss with respect to the base loss and a second partial gradient of the loss with respect to the link function;
      regularizing the first partial gradient of the loss to generate a regularized first partial gradient of the loss;
      generating a recomposition of the regularized partial first gradient of the loss and the second partial gradient of the loss; and
      computing the update from the generated recomposition.

10. The system of claim 9, wherein regularizing the first partial gradient of the loss comprises:
   determining whether a norm of the first partial gradient of the loss exceeds a particular threshold; and
   when the norm of the first partial gradient of the loss exceeds the particular threshold:
      clipping the first partial gradient of the loss to equal the particular threshold.

11. The system of claim 9, wherein:
   the machine learning model is a neural network; and
   computing the update from the generated recomposition comprises backpropagating the generated recomposition through network parameters.

12. The system of claim 9, wherein the base loss comprises a log loss, a square loss, a Matsushita loss, a boosting loss, or a Q-loss.

13. The system of claim 9, wherein the link function comprises a sigmoid function, a probit function, a capped linear function, or a Matsushita function.

14. The system of claim 9, wherein the model input includes one or more input variables, and the model output specifies a respective predicted classification for each input variable.

15. One or more non-transitory computer-readable storage media storing instructions that when executed by one or more computers cause the one or more computers to perform operations for training a machine learning model having a plurality of model parameters and configured to receive a model input and to process the model input in accordance with the model parameters to generate a model output based on the model input, the operations comprising: obtaining a training input and a corresponding ground truth output;
   processing the training input using the machine learning model and in accordance with current values of the model parameters to generate a training output based on the training input;
   computing a loss for the training output by evaluating an objective function that measures a difference between the training output and the ground truth output, wherein the objective function is composed of a base loss and a link function; and determining an update to current values of the model parameters, comprising:

determining, with respect to the model parameters, a first partial gradient of the loss with respect to the base loss and a second partial gradient of the loss with respect to the link function;

regularizing the first partial gradient of the loss to generate a regularized first partial gradient of the loss;

generating a recomposition of the regularized partial first gradient of the loss and the second partial gradient of the loss; and computing the update from the generated recomposition.

16. The computer-readable storage media of claim 15, wherein regularizing the first partial gradient of the loss comprises:

determining whether a norm of the first partial gradient of the loss exceeds a particular threshold; and when the norm of the first partial gradient of the loss exceeds the particular threshold:

clipping the first partial gradient of the loss to equal the particular threshold.

17. The computer-readable storage media of claim 15, wherein:

the machine learning model is a neural network; and computing the update from the generated recomposition comprises backpropagating the generated recomposition through network parameters.

18. The computer-readable storage media of claim 15, wherein the base loss comprises a log loss, a square loss, a Matsushita loss, a boosting loss, or a Q-loss.

19. The computer-readable storage media of claim 15, wherein the link function comprises a sigmoid function, a probit function, a capped linear function, or a Matsushita function.

20. The computer-readable storage media of claim 15, wherein the model input includes one or more input variables, and the model output specifies a respective predicted classification for each input variable.

* * * * *